Patented Apr. 17, 1923.

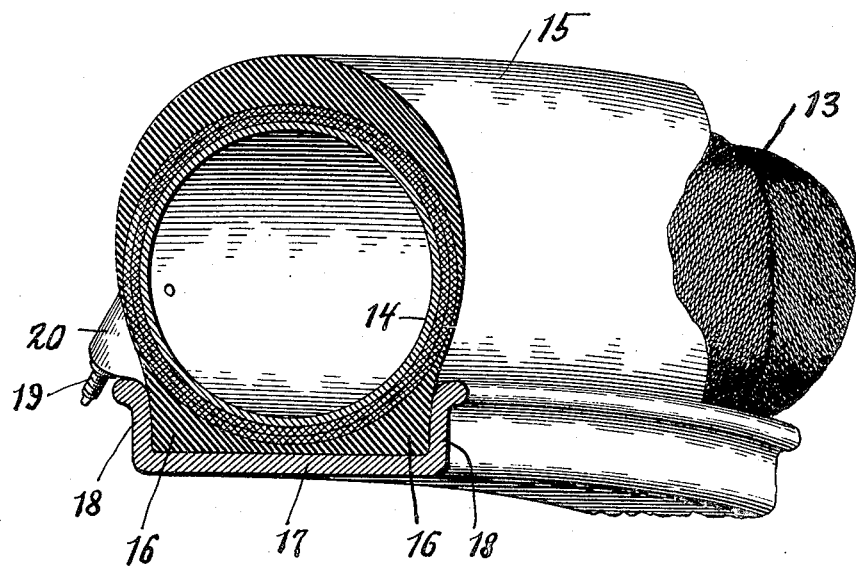

1,452,168

UNITED STATES PATENT OFFICE.

HARLAN S. RECTOR, OF CHICAGO, ILLINOIS.

PNEUMATIC TIRE.

Application filed August 9, 1921. Serial No. 490,943.

*To all whom it may concern:*

Be it known that I, HARLAN S. RECTOR, a citizen of the United States, and a resident of Chicago, in the county of Cook and State of Illinois, have invented certain new and useful Improvements in Pneumatic Tires, of which the following is a full, clear, and exact description.

The invention relates to pneumatic tires and more particularly to single tube tires.

The object of the invention is to provide an improved tire of this type which is adapted to be secured in the rim by pneumatic pressure alone, so that the necessity of cementing the tire in the rim will be avoided.

The invention consists in the several novel features hereinafter set forth and more particularly defined by claim at the conclusion hereof.

The drawing is a perspective of a pneumatic tire embodying the invention.

The improved tire comprises a carcass 13 which is formed of cord, strands of which are separated sufficiently to permit limited expansion of the carcass. The carcass is formed of several tubular plies of cord extending in crossed directions. The inside of the carcass is coated with rubber, as at 14, to form an air-tight chamber and with an outer covering of rubber 15 of sufficient thickness to form the tread of the tire and portions 16 which form a base conforming to, and fitting in, a rim comprising a base 17 and sides 18. The inner coating 14, the tread-portion 15 and the base portion 16 are all vulcanized together to form a jointless and continuous unitary structure referred to in the art as a "single tube" tire. A suitable casing valve 19, containing a check-valve through which the tire may be inflated is secured in an enlargement 20 at one side of the tire outside of the rim. When the tire is deflated, the carcass and rubber forming it may be stretched sufficiently to permit the base-portion of the tire to be forced over one side of the rim and into the rim channel. When the tire is inflated, the pressure will expand the carcass sufficiently to exert sufficient friction between the tire and the rim to secure the tire against creepage without being cemented or bolted to the rim. By placing the valve-nipple 19 outside of the rim, the necessity of cutting away the rim is dispensed with and, furthermore, in event the tire should become deflated while running, the valve nipple will not be cut from the tire.

The invention is not to be understood as restricted to the details set forth, since these may be modified within the scope of the appended claim, without departing from the spirit and scope of the invention.

Having thus described the invention, what I claim as new and desire to secure by Letters Patent, is:

The combination with a rim of a conventional form comprising a base and side flanges of a pneumatic tire composed of a jointless single tube provided with a base fitting in and normally shaped to conform to the base and flanges of the rim and a completely tubular carcass which permits sufficient and substantially uniform expansion throughout the base of the tire by air pressure to firmly secure the tire in the rim and against longitudinal displacement, entirely by friction produced by the pneumatic expansion of the tire against the base and flanges of the rim without localized distortion of the tire in the rim.

HARLAN S. RECTOR.